US006472637B2

(12) United States Patent

Ballem

(10) Patent No.: US 6,472,637 B2
(45) Date of Patent: Oct. 29, 2002

(54) CORE PLUG BLOCK HEATER AND METHOD

(75) Inventor: Steven W. Ballem, Mississauga (CA)

(73) Assignee: Noma Company, Ontario (CA)

( * ) Notice: Subject to any disclaimer, the term of this patent is extended or adjusted under 35 U.S.C. 154(b) by 0 days.

(21) Appl. No.: 09/859,771

(22) Filed: May 17, 2001

(65) Prior Publication Data

US 2001/0042741 A1 Nov. 22, 2001

Related U.S. Application Data

(60) Provisional application No. 60/204,977, filed on May 17, 2000.

(51) Int. Cl.[7] .................................................... B60L 1/02

(52) U.S. Cl. ....................... 219/205; 219/208; 219/534; 219/536; 123/142.5 E

(58) Field of Search ................................. 219/205, 202, 219/206, 208, 523, 534, 536, 207; 392/497; 123/196 AB, 549, 142.5 E

(56) References Cited

U.S. PATENT DOCUMENTS

| | | | | |
|---|---|---|---|---|
| 1,484,152 A | | 2/1924 | Pauly et al. | |
| 2,306,709 A | | 12/1942 | Miller | |
| 2,551,770 A | | 5/1951 | Smith | |
| 2,766,367 A | | 10/1956 | Chaustowich | |
| 2,834,864 A | | 5/1958 | Grinde | |
| 2,937,923 A | | 5/1960 | Shapleigh | |
| 3,335,459 A | | 8/1967 | Tyrner | |
| 3,646,314 A | * | 2/1972 | Windsor | 219/208 |
| 3,766,356 A | * | 10/1973 | Feldmann | 219/208 |
| 3,927,301 A | | 12/1975 | Heuel et al. | |
| 4,175,229 A | | 11/1979 | Brinkhof et al. | |
| 4,242,564 A | | 12/1980 | Kendall | |
| 4,286,139 A | * | 8/1981 | Taylor | 219/208 |
| 4,413,174 A | * | 11/1983 | Ting | 219/205 |
| 4,465,039 A | * | 8/1984 | Snelgrove et al. | 123/142.5 E |
| 4,480,604 A | | 11/1984 | Chang et al. | |
| 4,485,771 A | | 12/1984 | Brinkhof et al. | |
| 4,622,455 A | | 11/1986 | Schwarzkopf | |
| 4,634,834 A | * | 1/1987 | Lupoli et al. | 219/208 |

(List continued on next page.)

FOREIGN PATENT DOCUMENTS

DE 2935430 3/1981

OTHER PUBLICATIONS

Plastics Materials and Processes, authored by Seymour S. Schwartz and Sidney H. Goodman, Published by Van Nostrand Reinhold Company, 1982; pp. 533–535; 554–557; 865–869.

*Primary Examiner*—Teresa Walberg
*Assistant Examiner*—Fadi H. Dahbour
(74) *Attorney, Agent, or Firm*—Rader, Fishman & Grauer PLLC

(57) ABSTRACT

In accordance with the present invention, the heater provides a core plug having one open axial end and one closed axial end to define a hollow housing. During installation, the closed end of the housing is secured into an engine core bore, such that at least a portion of housing projects inwardly of the bore and is immersed in engine fluid. Independently, a heating element, adaptable to an external power supply, is releasably inserted inside the hollow housing. Heat is therefore conducted directly through the housing directly to the engine fluid and the engine itself. A quick-release retaining member is installed to retain the heating element within the housing while still allowing free rotation of the heating element therein. The free rotation of the heating element allows an electrical connector from an external power source to interconnect with the heating element completely independent of the final orientation of the heating element inside the core plug or the end orientation of the core plug within the engine bore. The present invention therefore functions as both an immersion and a dry heater while simplifying installation and replacement.

29 Claims, 4 Drawing Sheets

U.S. PATENT DOCUMENTS

| | | | | | |
|---|---|---|---|---|---|
| 4,723,065 | A | * | 2/1988 | Meyer | 219/205 |
| 4,727,239 | A | * | 2/1988 | Lupoli et al. | 219/208 |
| 4,851,640 | A | * | 7/1989 | Smith | 219/208 |
| 4,901,686 | A | * | 2/1990 | Scott | 123/142.5 E |
| 4,971,576 | A | * | 11/1990 | Thimmesch | 219/205 |
| 5,021,633 | A | | 6/1991 | Schaefer | |
| 5,095,193 | A | | 3/1992 | Doyle | |
| 5,117,556 | A | | 6/1992 | Schaefer | |
| 5,210,393 | A | | 5/1993 | Shier | |
| 5,538,439 | A | | 7/1996 | Fell et al. | |
| 5,553,578 | A | | 9/1996 | Nguyen | |
| 5,567,337 | A | | 10/1996 | Ewards et al. | |
| 5,584,269 | A | | 12/1996 | MacKenzie | |

* cited by examiner

CORE PLUG BLOCK HEATER AND METHOD

RELATED APPLICATION

This application claims priority to U.S. Provisional Application No. 60/204,977, filed on May 17, 2000, the contents of which are incorporated herein in its entirety.

FIELD OF THE INVENTION

The present invention relates to engine block heaters, and more particularly, to a combination of a core plug and block heater with a removable, free rotating heating element cartridge.

BACKGROUND OF THE INVENTION

Engine block heaters are well-known in the prior art, and are generally of two types. An immersion-type block heater includes a heating element inserted through an engine bore such that the heating element is "immersed" into an engine coolant or fluid. Upon an electrical connection to the heating element, heat from the element warms the engine fluid directly, permitting improved starting of the engine in extreme cold. The heating element is typically placed within an open-ended housing, which is threadedly inserted into the engine bore, providing a direct access channel for the heating element to contact the fluid. To prevent fluid leakage between the heating element and the housing, the heating element is permanently welded or soldered into the housing. Because the heating element is permanently fixed within the housing, replacement of the heating element requires replacement of the entire heater and drainage of the fluid.

Alternatively, a housing, with the permanently fixed heating element extending therein, is inserted into the engine bore through an O-ring sealer, mounting the O-ring between the housing and the interior walls of the bore. The O-ring is designed as a seal to prevent fluid from escaping through the bore around the loose interface formed between the surface walls of the housing and the bore. In this heater configuration, a fastener secures the housing, inserted through the O-ring, in a fixed position to an exterior surface of the engine block. The housing, and correspondingly the heating element, do not rotate within the bore because such rotation may distort the O-ring sealer, opening gaps between the housing and bore surfaces from which fluid may leak.

To install or replace an immersion heater, all engine fluid must be drained, and in some cases, if used, the O-ring must be replaced. Further, the use of O-ring, over a period of time under high temperatures, results in an addition disadvantage for the O-ring may permanently set to the bore, or otherwise deteriorate, thereby failing to provide a sufficient seal and allowing engine fluid to leak through the bore and soil the electrical connection between the heating element and an external power source causing the heater to malfunction. Likewise, the O-ring may fail to seat properly during installation, causing an insufficient seal leading to the loss of engine fluid. Additionally, aftermarket installation of an immersion-heater is cumbersome and time consuming, requiring drainage of the engine fluid before the heater may be installed or the heater and/or the heating element replaced.

A second type of engine block heater is referred to as a "dry" or "cartridge-type" heater. Instead of being inserted through a bore that taps an engine fluid chamber, the dry heater is threadedly inserted into a bore specially drilled into a portion of the engine housing adjacent to but not intersecting the fluid chamber. Alternatively, the heater is placed in the bore by a fastener that mounts the heater in a fixed position to an external surface of the engine block. In either application, the heater, within the bore, does not directly contact the coolant. When an electrical connection is made to the dry heater, heat is conducted directly into the walls of the engine, and from there, indirectly to the engine coolant. While the dry heater eliminates engine fluid leaks, its effectiveness and efficiency is reduced because of the relatively large thermal mass (i.e. the engine block and/or head) that must be heated prior to heating the fluid within the engine.

In both types of heaters, electrical power is provided to the heating element by means of a power cord/connector combination that engages the heating element. One part of the connector combination is usually permanently mounted to the heating element. As may be appreciated, the final orientation of the heater-mounted connector portion is highly dependent upon the rotational orientation of the heating element after threaded interconnection to the engine block. In particular, thread start and stop points may vary significantly between engines, and even between engines of the same type due to manufacturing variances. Thus, a final heater-mounted connector orientation may vary significantly between identical engines. Moreover, the cord-mounted connector portion has limited positions in the confined space about the engine to effect interconnection between the cord and the heating element, thereby increasing the difficulty of connecting the heater to a power supply for operation.

Accordingly, an engine block heater is needed that overcomes the aforementioned difficulties and limitations.

SUMMARY OF THE INVENTION

To overcome the difficulties associated with block heaters, the present invention provides a generally annular cylindrical core plug having one open axial end and one closed axial end to define a hollow housing. A portion of the housing exterior is threaded for engagement with a corresponding threaded core bore of an engine that extends from an outer surface of the engine to an interior fluid chamber. Additionally, the housing exterior may include a sealing flange for sealingly engaging the outside perimeter of the engine core bore.

During installation, the closed end of the housing is inserted into the bore, and the housing is threadedly secured in place such that at least a portion of housing projects inwardly of the bore and is immersed in engine fluid inside the chamber. At any time after installation of the housing, a heating element is inserted into a housing cavity. The heating element has a radial diameter slightly smaller than the radial inner diameter of the housing cavity for easy insertion and rotation therein. Once inserted, a quick-release fastener is installed to retain the heating element within the housing while still allowing free rotation of the heating element.

The heating element of the present invention is therefore dry inserted within the housing so that no direct contact exists between the heating element and the engine fluid. As a result, the heating element does not need to be permanently welded into the housing or no O-ring is required to seal the interface between the surfaces of the bore and the housing, thereby removing the possibility of leaks therebetween. If desired, a flange may be formed on the exterior of the housing adjacent the threaded portion to tightly fit against the outer surface of the engine, thereby sealing the bore against leakage.

Additionally, since the heating element is retained within the housing only by the quick-release fastener, the heating element is free to rotate 360 degrees within the housing. Any electrical connector attached to the heating element is likewise free to rotate, making orientation of the electrical connector from the external power source easier, especially within confined spaces. The free rotation of the heating element allows the electrical connector to interconnect with the heating element completely independently of the final orientation of the heating element inside the core plug or the end orientation of the core plug within the engine bore. Upon application of electrical current, the heating element heats, thermally expanding the materials that constitute the heating element. This thermal expansion increases the diameter of the heating element, forcing the exterior walls of the heating element against the internal walls of the housing cavity to lock the heating element in place within the housing and to provide a direct transfer path of heat conductance from the heating element to the housing to be radiated directly to the engine fluid and the engine block. The present invention therefore has the advantages of an immersion heater, namely the ability to directly warm the engine fluid to quickly and efficiently heat the engine, and a dry heater, which provides simplified installation and replacement of the heater while minimizing the possibility of fluid leakage.

DETAILED DESCRIPTION

Figure 1:
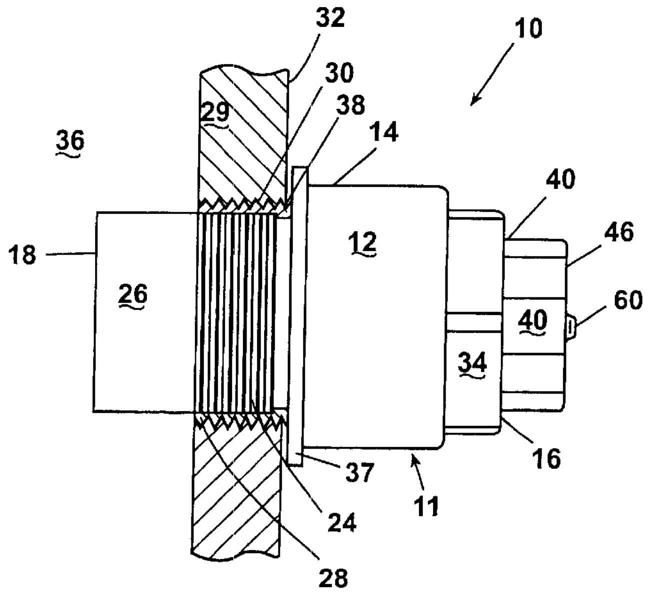
FIG. 1 is a front view of the core plug and cartridge heater installed in an engine block.
Figure 2:
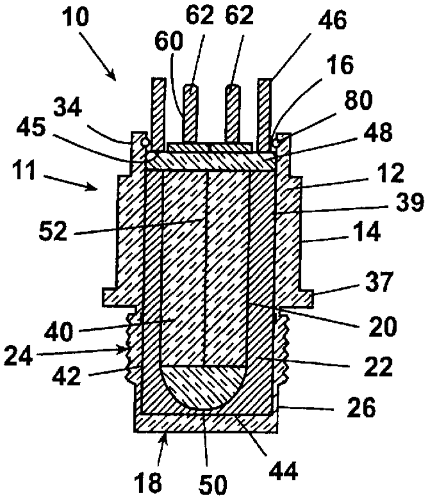
FIG. 2 is a cross sectional view of the core plug and cartridge heater of FIG. 1.

FIGS. 1 and 2 show a generally annular cylindrical core plug heater 10 defined by a core plug 11 and a heating element 40. Core plug 11 comprises a hollow housing 12. Housing 12 provides exterior walls 14 extending between an open axial end 16 and a closed axial end 18. Interior walls 20 define an interior cavity 22 of the housing. Interior cavity 22 is generally annularly cylindrical in shape. Housing 12 is made of brass or any other known heat-conductive material. Core plug 11 is shown as a generally annular cylindrical housing 12. The Plug 11 may also take alternative shapes to conform to an engine core bore 28. Bore 28 extends through an engine 29 from an interior fluid chamber 36 to an exterior surface 32 of the engine.

Exterior walls 14 includes a threaded portion 24, threaded for engagement with engine bore 28 of engine block 29. Threaded portion 24 provides threads that extend around a surface of walls 14 and is adapted to matingly engage a corresponding set of threads 30 formed in engine bore 28. A torquing collar 34 defines a top portion of housing 12. The closed axial end 18 of housing 12 is inserted into bore 28, and housing 12 is threadedly secured in place in bore 28 such that at least a lower portion 26 of housing 12 projects inwardly through bore 28 into fluid chamber 36 and is immersed in engine fluid, such as engine coolant or oil. The engagement of threaded portion 24 with engine bore 28 effectively seals the bore, preventing the escape of fluid from chamber 36 while providing access to the fluid for direct heating by core plug heater 10.

In the illustrated embodiment, open axial end 16 of housing 12 is defined by torquing collar 34. Collar 34 has a fixed geometric shape (e.g. hexagonal) and is designed to receive a fastening device, such as a socket, for threadedly driving housing 12 about threads 24 and 30 into position in engine bore 28. The described shape of collar 34 is not imperative to the invention, and any shape of collar 34 or a housing 12 without collar 34 could be designed to accommodate various methods for securing core plug 11 within bore 28. Likewise, threads 24 and 30 as shown can be replaced with other methods known in the art for sealingly securing a plug in a bore, such as cementing or soldering plug 11 into a sealing engagement within bore 28.

Additionally, a sealing flange 37 may extend from walls 14 of housing 12. Flange 37 sealingly engages exterior surface 32 about an outside perimeter 38 of bore 28, providing an additional barrier against leakage of fluid from engine 29 through bore 28. Flange 37 also serve as a stop against over-threaded insertion of plug 11 into bore 28 and sets the proper position of lower portion 26 of housing 12 within chamber 36.

Figure 3:
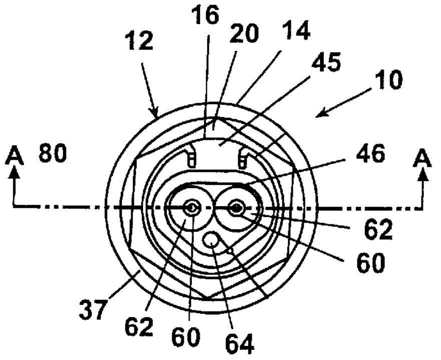
FIG. 3 is a top view of the core plug and cartridge heater of FIG. 1.
Figure 5:
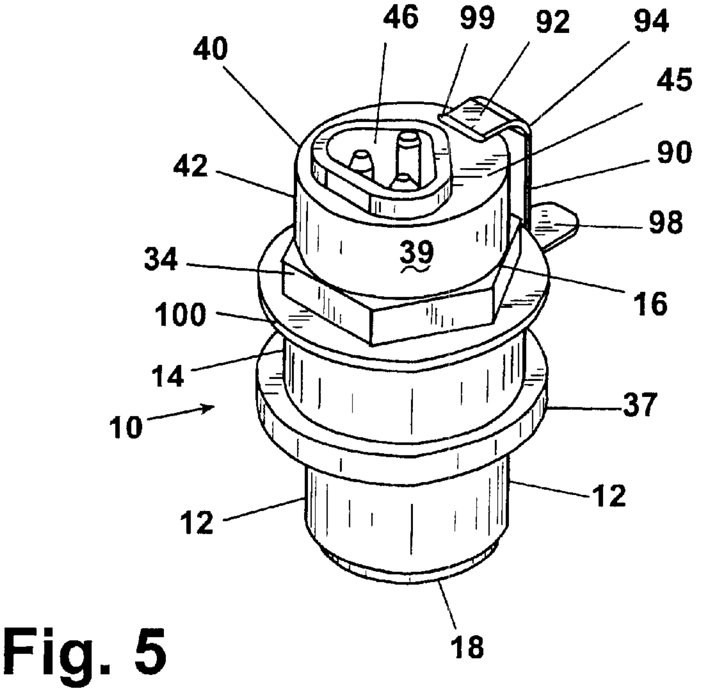
FIG. 5 is a perspective front view of an alternative embodiment of the core plug and cartridge heater.

A heating element 40 of the present invention is a dry cartridge-style heater insertable into interior housing cavity 22. Heating element 40 is defined by sleeve 42. Sleeve 42 provides a body 39, extending between an end portion 44 and a top portion 45, with a radial diameter slightly smaller than the radial inner diameter of cavity 22 for easy insertion and rotation therein. In cavity 22, end portion 44 of sleeve 42 resides adjacent to closed axial end 18 of housing 12. A connector receptacle 46 axially extends from top portion 45 of body 39 through the open axial end 16 of housing 12. Connector receptacle 46 has a diameter smaller that the radial diameter of sleeve 42. In one embodiment, top portion 45 of body 39 resides substantially within cavity 22. Alternatively, as shown in FIG. 5, body 39 and connector receptacle 46 may extend beyond cavity 22 through open axial end 16. FIG. 3 shows connector receptacle 46 formed in a heart-shaped configuration, but it could be formed in any configuration to receive the shape of an electrical connector 70.

As shown in FIG. 2, sleeve 42 encases a heating coil 50. Heating coil 50 comprises a metallic tube 52 molded into an U-shaped configuration. A wire runs throughout tube 52. A thermally conductive powder, such as magnesium oxide, fills tube 52, snugly packed about the wire. Electrical conductors 60 extend axially in parallel from each leg of the U-shaped tube 52 and are interconnected by the wire. Electrical conductors 60 include a pair of terminals 62 commonly known in the art and also may include a ground pin 64. A metallic material, such as aluminum is then casted or molded around tube 52 encasing the tube to form sleeve 42 with connector receptacle 46 and also setting the orientation of electrical conductors 60, extending axially therefrom. A machining process may be utilized to smooth or refine the shape of sleeve 42 after casting to adapt sleeve 42 for insertion into housing 12 or to receive electrical connector 70.

When activated, heating element 40 heats, thermally expanding the materials that constitute the heating element.

This thermal expansion increases the diameter of sleeve 42, forcing its exterior walls against internal walls 20 of housing cavity 22 to lock sleeve 42 in place within the housing and to provide a direct transfer path for heat conductance from the heating element to the housing to be radiated directly to both the engine fluid and engine block 29. Because housing 12 extends directly into fluid chamber 36 and directly contacts the engine fluid, heating element 40 through housing 12 has a direct heat transfer path to warm the fluid, thereby providing substantially the same heat transfer and warming capabilities of an immersion heater of the same size and thermal properties. The direct contact between housing 12 and bore 28 also provides heating element 40 to directly warm engine block 29 through the conductance of heat from sleeve 42 through the thermally conductive walls of housing 12 to the engine block.

Because housing 12 is closed at axial end 18, the heating element need not be permanently soldered or welded to the walls of cavity to seal against leakage of fluid. Moreover, no O-ring is required to seal the interface between the bore walls and the housing, thereby removing the possibility of leaks therebetween, which is a common problem with prior engine heaters that contact engine fluid. Additionally, because O-ring seals degrade over time due to engine heat and frictional stresses, fluid leaks through the bore retaining the immersed heating element commonly occur. Elimination of an O-ring reduces both engine and heater maintenance and the potential for heater malfunction from fluid leakage through a failed O-ring, which may contaminate electrical conductors 60, leading to heater failure. The elimination of the O-ring or the permanent seal between the housing and the heating element also provides flexibility in the insertion and orientation of the heating element to adjust to receive the electrical connection to power the heating element. Additionally, the presence of housing 12 permits the ease of installation and/or replacement of heating element 40, by avoiding the burdensome task of draining engine fluid prior to the installation or repair of conventional fluid-immersed engine heaters.

Figure 4:
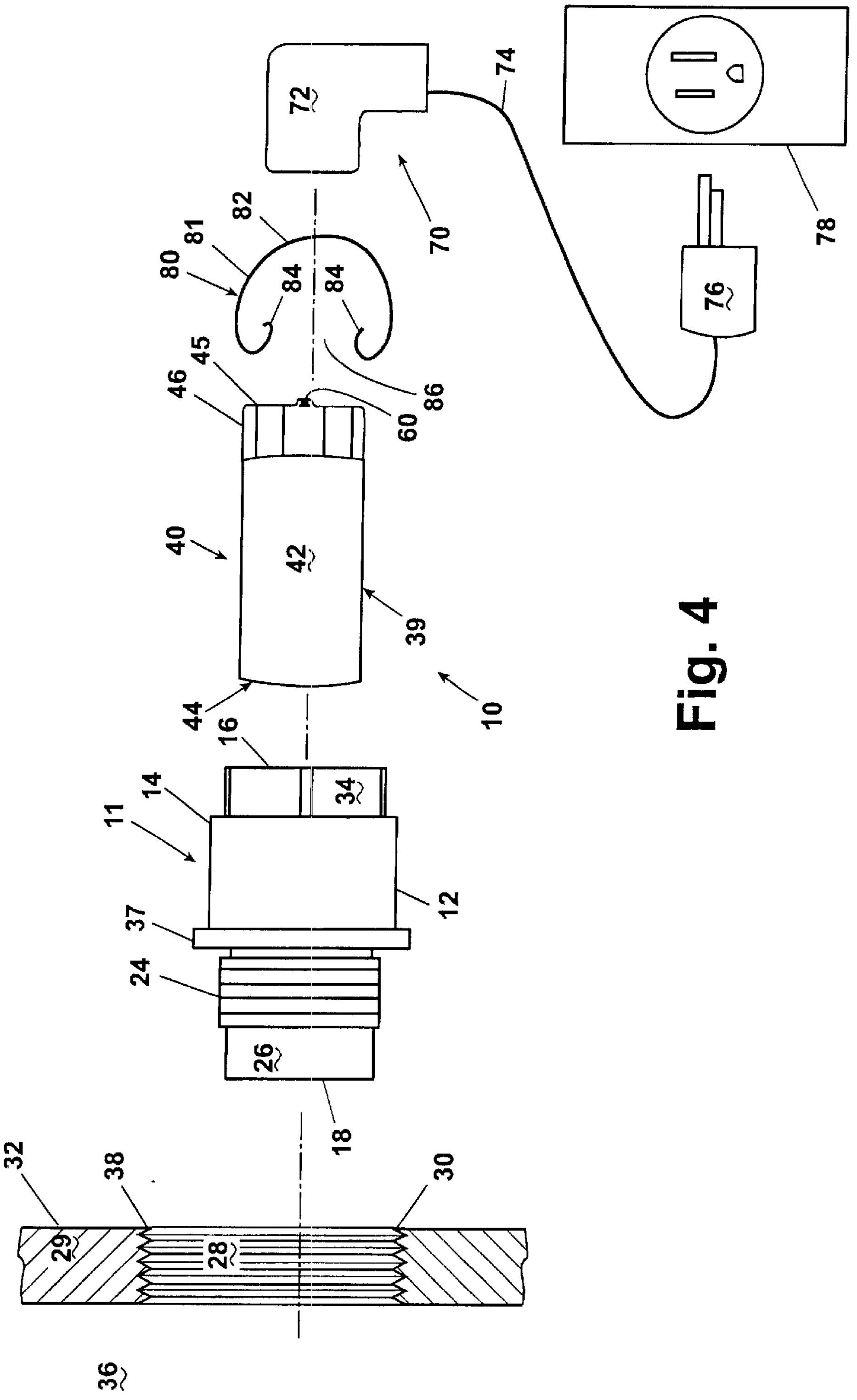
FIG. 4 is an assembly view of the core plug and cartridge heater installed in the engine block.

As shown in FIG. 4, electrical connector 70 generally comprises connector body 72, cord 74, and a terminal plug 76. Connector body 72 provides a socket that receives electrical conductors 60 to form an electrical connection between heating element 40 and electrical connector 70. The shape of connector body 72 matches the shape of connector receptacle 46 to be snugly received within the receptacle.

Figure 7:
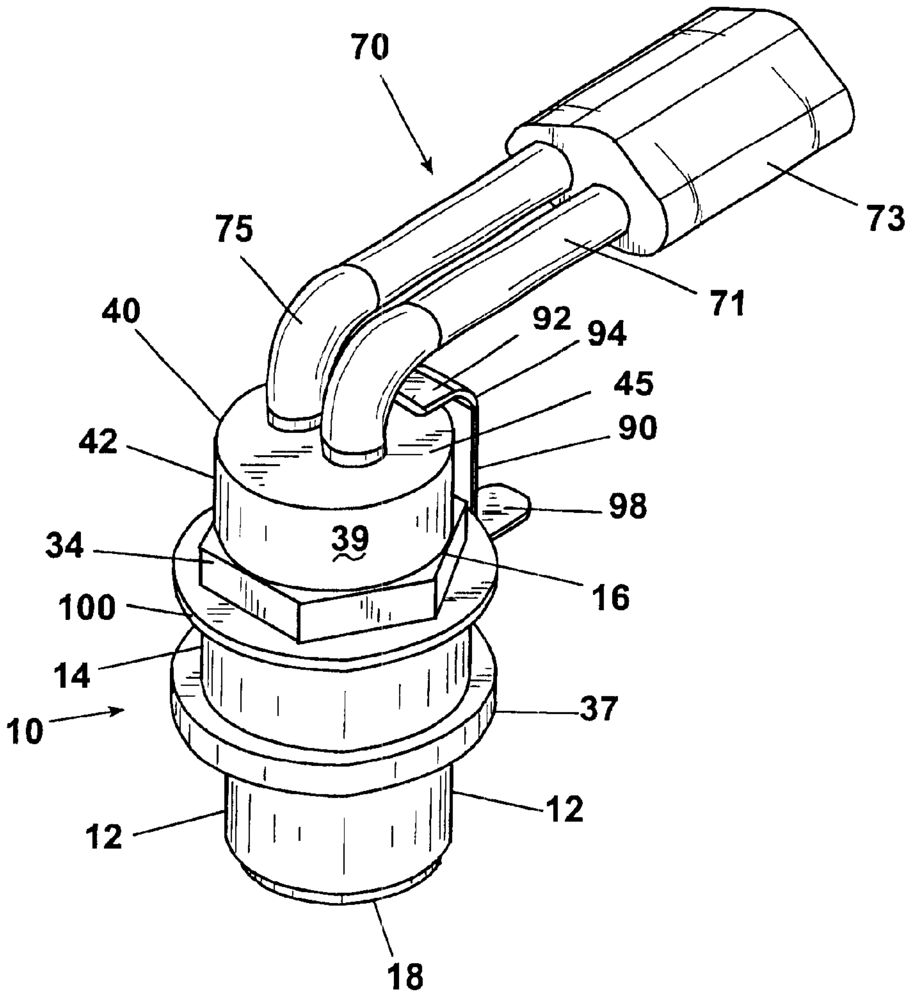
FIG. 7 is a perspective front view of an alternative embodiment of the core plug and cartridge heater.

Connector body 72 is provided with a rubber or other insulating cover to protect electrical conductors 60 from adverse environmental conditions. Terminal plug 76 is adapted to connect to an external electrical power source 78. Cord 74 is designed to deliver electricity from the external electrical power source, through the union of connector body 72 and electrical conductors 60 to provide the necessary power to heating element 40. Generally, cord 74 is long enough to extend from engine 29 to outside a vehicle to enable terminal plug 76 to be received into an electrical socket available in a garage or alternative power source, like a generator, located remote from the vehicle in which engine 29 resides. Alternatively, as shown in FIG. 7, electrical connector 70 may also comprise a conduit pair 71 and a socket 73. Conduit pair 71 are tubular members, which replace connector receptacle 46, that extends through top portion 45 of sleeve 42. Conduit pair 71 carry a pair of wires that connect to conductors 60 inside the conduit or connect directly to the wire that runs through the heating element. Conduit pair 71 supports an elbow 75 design to orient electrical connector 70 away from heater 10 but generally parallel and in proximity to engine block 24 to accommodate the positioning of electrical connector 70 in the generally confined engine compartment. Conduit pair 71 connects to socket 73. Socket 73 provides terminals to receive a plug 72 on a power cord 74 supplying electrical power from an external power source such as an electrical outlet in a garage or on a generator. Socket 73 is made of plastic, rubber or other insulating material to protect the terminals therein from dirt, grime and the elements and may be designed in any configuration to conform to the shape of plug 72. Overall, electrical connector 70 is design to serve as an elongated extension from heater 10 to enable a user easier access to connect heater 10 to the external power supply at a location remote of the heater.

A quick-release retaining member 80 retains heating element 40 within housing 12. As shown in FIGS. 3 and 4, retaining member 80 takes the form of retaining spring 81, a resilient wire formed of a generally circular body 82 terminated with a pair of arms 84. In an unbiased position, circular body 82 possesses a radial diameter slightly larger than the radial diameter of cavity 22 of housing 12. Arms 84 extend generally perpendicular to the plane in which circular body 82 resides and are separated by a pinch gap 86. Arms 84 provide easily accessible grip points to bias spring 81 by pushing arms 84 together to reduce the size of pinch gap 86. The minimized pinch gap 86 reduces the radial diameter of circular body 82 to a diameter less than that of cavity 22 of housing 12. In such a biased state, retention spring 81 can be placed around connector receptacle 46 and above top portion 45 of sleeve 42 and into an upper region of housing cavity 22. Once inside cavity 22, releasing arms 84 pushes circular body 82 radially outwards to transfer the spring's bias against interior walls 20 of cavity 22. Inside cavity 22, spring 81 engages interior walls 20 in a position adjacent to top portion 45 of body 38, thereby prohibiting axially longitudinal movement of heating element 40 within cavity 22, but enabling heating element 40 to rotate independently of the engine within the cavity during installation. Because heating element 40, in a non-operational state, has a radial diameter only slightly smaller than the radial diameter of housing cavity 22, partial surface contact between the wall of sleeve 42 and interior walls 20 of cavity 22 exists, frictionally engaging sleeve 42 to retain heating element 40 within housing 12 and to prevent undesirable spinning of heating element 40 in the cavity during vehicle operation, which may over time damage or degrade the element from unnecessary movement within the housing. To overcome the surface friction between sleeve 42 and interior walls 20 of cavity 22, a moderate torquing force, that can be applied through manual band adjustment, is sufficient to rotate heating element 40 within cavity 22 to orient element 40 to position connector receptacle 46 in a manner to simplify or optimize the interconnection of heating element 40 to electrical connector 70.

Figure 6:
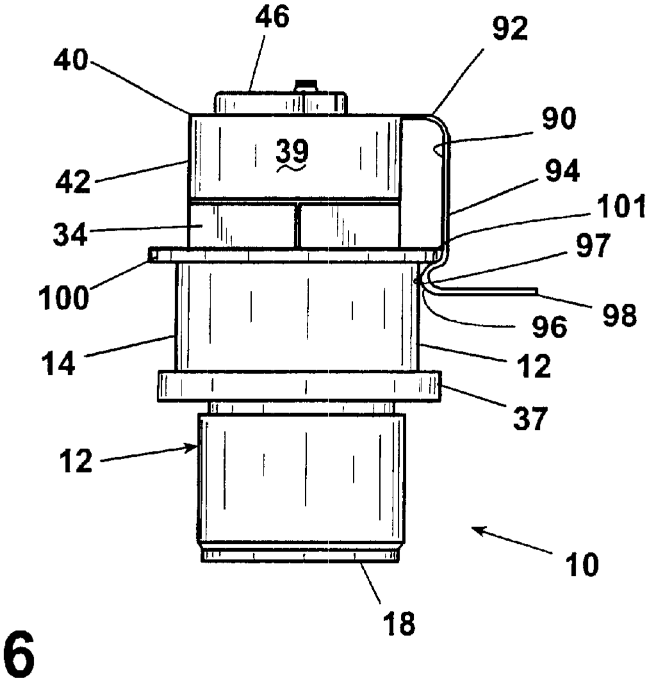
FIG. 6 is a side view of the core plug and cartridge heater of FIG. 5.

In an alternative embodiment, FIGS. 5 and 6 show the retaining member as a spring clip 90. Spring clip 90 is comprised of a curved extension 92, a body 94, a retaining lip 96 and a release tab 98. Curved extension 92 interconnects body 94 with top portion 45 of sleeve 42. Curved extension 92 is received into a notch 99 in top portion 45 to frictionally secure or lock clip 90 to heating element 40. Alternatively, curved extension 92 could be secured to sleeve 42 by a variety of methods including solder, a weld, or other physical fasteners. Curved extension 92 connects with retaining lip 96 by body 94. Retaining lip 96 is a curved tight-radius portion that curves towards housing 12 to provide a retaining surface 97 designed to engage a second flange 100 extending around exterior surface 14 of housing 12 between collar 34 and closed axial end 18. Tab 98 connects to lip 96 to terminate clip 90 in a direction opposite to retaining surface 97 formed by lip 96.

Upon the insertion of sleeve 12 within cavity 22, clip 90 engages flange 100. Flange 100 is shaped so that lip 96 snaps over or about the flange to retain heating element 40 inside cavity 22. More specifically, clip 90 is biased to extend over flange 100 to place retaining surface 97 in frictional engagement with a lip or edge 101 of flange 100. Because flange 100 extends around housing 12, clip 90 may be positioned at any location about housing 12, thereby permitting sleeve 42 to freely rotate in cavity 22 to orient connector receptacle 46 to positions to aid in its connection to the outside power source as discussed herein. Tab 98 provides an easily accessible grip point to bias clip 90 for attachment to flange 100 or to provide a quick-release to unbias the clip, disengaging it from housing 12. Tab 98 also provides an easy-to-locate release point to permit the quick disengagement of the clip and a handle to aid in the removal of heating element 40, tasks that could otherwise be difficult and time consuming to accomplish because of the tight confines about the engine in the vehicle engine compartment and the low-observability of the components therein resulting from the engine block's orientation.

Overall, retaining member 80, be it spring 81 or clip 90, increases the ease of installation and replacement of heating element 40 in a confined engine compartment and decreases the time needed to secure/unsecure the heating element by eliminating the commonly employed but labor-intensive fastening methods such as screws, bolts, or solder, which require precision tools to affect retention and are difficult to operate in confined areas.

Because heating element 40 is retained within housing 12 only by quick-release retaining member 80, heating element 40 remains rotatable 360 degrees within housing 12 upon the application of sufficient force to overcome the frictional surface forces between sleeve 42 and cavity walls 20 that retain heating element 40 in position within the housing. The rotation of the heating element permits free orientation of connector receptacle 46 and electrical conductors 60 to receive electrical connector 70. This flexibility of orientation of the connector receptacle provides mobility and freedom to position electrical connector 70 within confined spaces about engine 29, permitting connector body 72 of electrical connector 70 to interconnect with the heating element completely independent of the final orientation of the heating element inside housing 12 or the end orientation of core plug 11 within bore 28. The rotatability of heating element 40 independent of engine configuration also permits the use of core plug heater 10 in a wide variety of engines and eliminates the need for separate heater models specifically designed to orientate the connector receptacle in a select position based on the engine or vehicle model to facilitate the interconnection of the heating element to the external power source because of varying engine configurations or space constraints within a vehicle's engine compartment.

Upon application of electrical current, heating element 40 thermally expands to contact walls 20 in cavity 22. This thermal expansion increases the diameter of sleeve 42, forcing its exterior walls against internal walls 20 of housing cavity 22 to lock sleeve 42 in place within the housing and to provide a direct transfer path of heat conductance from the heating element to the housing to be radiated directly to both the engine fluid and engine block 29. Because housing 12 extends directly into fluid chamber 36 and directly contacts the engine fluid, heating element 40 through housing 12 has a direct heat transfer path to warm the fluid. The direct contact between housing 12 and bore 28 also permits heating element 40 to directly warm engine block 29 through the conductance of heat from sleeve 42 through the thermally conductive walls of housing 12 to the engine block. Heat is therefore conducted directly through housing 12 to the fluid in chamber 36, while a portion of heat is also conducted simultaneously to engine 29 itself from the contact between housing 12 and bore 28. Thus, the present invention functions as both an immersion heater directly warming the engine fluid and a dry heater that directly warms the engine block itself.

Core plug heater 10 enables an improved methodology for installing and repairing/replacing an engine heater. By separating housing 12 from heating element 40, the engine bore sealing component, plug 11, is installed in the engine bore 28 independently of the more fragile and expense heating element 40. Housing 12 may be inexpensively installed during engine assembly and later equipped with the heating element if the vehicle's purchaser requests such option. Housing 12 is secured in engine bore 28 through the use of threads or other securing/retaining methods and partially projects into fluid chamber 36. Housing 12 effectively seals engine bore 28, prohibiting the escape or leakage of fluid from chamber 36. A sealing flange 37 may extend from housing 12 to mate with exterior surface 32 of engine 29 about outside perimeter 38 of bore 28, providing an additional barrier against leakage of fluid through the bore. Flange 37 also serve as a stop that sets the proper position of lower portion 26 of housing 12, extending into chamber 36 for active heating of the fluid therein.

If desired, heating element 40 is releasably inserted into housing 12. The insertion of heating element 40 does not require drainage of fluid chamber 36 or the addition of further sealing members, such as an O-ring, to prevent leakage of fluid from the chamber. A retaining member 80 retains heating element 40 in housing 12.

The use of quick-release retaining member 80, such as retention spring 81 or clip 90, increases the ease of installation and replacement of core plug heater 10 in confined engine compartments and decreases the time needed to secure/unsecure heating element 40 by eliminating conventional labor-intensive fastening methods such as screws, bolts, or soldering, which require precision tools to affect retainment that are difficult to operate in confined areas. Since retaining member 80 does not secure heating element 40 in a fixed position, heating element 40 is rotatable 360 degrees inside housing 12 independent of the engine or its configuration. This freedom of rotation provides indefinite arrangements for positioning connector receptacle 46 to receive the electrical connector 70, which provides power to heating element 40 upon interconnection with electrical conductors 60. Because of different engine configurations and confined space within engine components, flexibility in the orientation of connector receptacle to receive electrical connector 70 simplifies interconnection between heater 10 and the external power supply regardless of the engine configuration or engine or vehicle model.

The above described advantages of the core plug heater invention are by no means meant to limit the scope of the invention. Though the invention has been described with respect to the preferred embodiments thereof, many variations and modifications will become apparent to those skilled in the art. It is therefore the intention that the claims be interpreted as broadly as possible in view of the prior art, to include all such variations and modifications.

What is claimed is:

1. An engine block heater for heating an engine, comprising:

a generally annular cylindrical core plug secured in an engine bore, having one open axial end and one closed axial end to define a hollow housing with an interior first diameter; and a heating element insertably received within said housing, said heating element having a second diameter smaller than said first diameter such that said heating element may rotate independently within said housing relative to said engine to orient said heating element to receive an electrical connection from an external power source.

2. The heater of claim 1, wherein said closed axial end is inserted within said bore such that at least a portion of said housing is immersed in an engine fluid.

3. The heater of claim 1, wherein said heating element further includes an electrical conductor that is orientated through rotation of said heating element to receive an electrical connection from said exterior power source.

4. The heater of claim 1, wherein said heating element is retained in said housing by a retaining member that does not impair said rotation of said heating element in said housing.

5. The heater of claim 4, wherein said retaining member retains said heating element by engaging an interior wall that defines said interior first diameter of said housing.

6. The heater of claim 4, where in said retaining member retains said heating element by engaging an exterior surface of said housing.

7. The heater of claim 1, wherein said heating element rotates 360 degrees relative to said housing.

8. The heater of claim 1, wherein said heating element thermally expands within said housing.

9. The heater of claim 8, wherein said thermal expansion locks said heating element in place within said housing.

10. The heater of claim 8, wherein said thermal expansion prevents said heating element from rotating in said housing.

11. The heater of claim 8, wherein said thermal expansion improves contact between said heating element and said housing to aid in heat conductance from said heating element to said housing for the purpose of heating the engine.

12. An engine block heater for contacting fluid within an engine, comprising:

a housing having one open axial end and one closed axial end to define a cavity defining a first diameter, wherein said housing about said closed axial end is adapted to be positioned in the engine to contact the fluid; and a heating element insertably and releasably received within said cavity, said heating element having a second diameter smaller than said first diameter of said cavity such that said heating element is rotatable within said cavity to position said heating element independently of said position of said housing relative to the engine.

13. The heater of claim 12, wherein said housing seals against a leakage of the fluid from the engine.

14. The heater of claim 12, wherein said heating element radiates heat to directly warm both the fluid and the engine simultaneously.

15. The heater of claim 12, wherein said heating element further includes an electrical conductor orientated through rotation of said heating element to receive an electrical connector from an exterior power source.

16. The heater of claim 12, wherein said heating element is retained in said housing by a retaining member that does not impair said rotation of said heating element therein.

17. The heater of claim 16, wherein said retaining member retains said heating element by engaging an interior walls that defines said interior first diameter of said housing.

18. The heater of claim 16, wherein in said retaining member retains said heating element by engaging an exterior surface of said housing.

19. The heater of claim 12, wherein said heating element rotates 360 degrees relative to said housing.

20. The heater of claim 12, wherein said heating element thermally expands within said cavity.

21. The heater of claim 12, wherein said thermal expansion locks said heating element in place within said cavity.

22. The heater of claim 12, wherein said thermal expansion prevents said heating element from rotating in said cavity.

23. The heater of claim 12, wherein said thermal expansion improves contact between said heating element and said housing to aid in heat conductance from said heating element to said housing for the purpose of heating the engine.

24. A method for installing an engine block heater into a fluid chamber of an engine, comprising the following steps:

inserting a housing having one open axial end and one closed axial end defining an interior cavity through a bore in the engine block such that said closed axial end of said housing enters the fluid chamber;

securing said housing in said bore;

releasably inserting a heating element into said interior cavity of said housing;

retaining said heating element in said housing with a quick-release retaining member;

rotating said heating element in said housing to connect said heating element to a power source.

25. A method as in claim 24, wherein said retaining member is insertable inside said cavity adjacent to said heating element.

26. A method as in claim 24, wherein said retaining member engages an outside surface of said housing.

27. A method as in claim 24, wherein said heating element further includes an electrical conductor orientated through said rotation of said heating element to receive an electrical connector from said power source.

28. A method as in claim 24, wherein said securing said housing in said bore further comprises sealing said bore to prohibit a leakage of fluid from said bore.

29. A method as in claim 24, wherein said heating element thermally expands to improve contact between said heating element and said housing to aid in heat conductance from said heating element to said housing for the purpose of heating the engine.

* * * * *